United States Patent
Confer

(10) Patent No.: US 11,205,819 B2
(45) Date of Patent: Dec. 21, 2021

(54) SYSTEMS AND METHODS FOR A BATTERY PANEL ASSEMBLY ON A MATERIAL HANDLING VEHICLE

(71) Applicant: The Raymond Corporation, Greene, NY (US)

(72) Inventor: Thomas W. Confer, Chenango Forks, NY (US)

(73) Assignee: The Raymond Corporation, Greene, NY (US)

( * ) Notice: Subject to any disclaimer, the term of this patent is extended or adjusted under 35 U.S.C. 154(b) by 43 days.

(21) Appl. No.: 16/817,302

(22) Filed: Mar. 12, 2020

(65) Prior Publication Data
US 2020/0321573 A1   Oct. 8, 2020

Related U.S. Application Data
(60) Provisional application No. 62/829,420, filed on Apr. 4, 2019.

(51) Int. Cl.
| | | |
|---|---|---|
| *B60K 1/04* | (2019.01) | |
| *H01M 50/20* | (2021.01) | |
| *H01M 50/148* | (2021.01) | |
| *H01M 50/155* | (2021.01) | |

(52) U.S. Cl.
CPC ......... *H01M 50/20* (2021.01); *H01M 50/148* (2021.01); *H01M 50/155* (2021.01); *H01M 2220/20* (2013.01)

(58) Field of Classification Search
CPC .................................... B60K 1/00; B60K 1/04
See application file for complete search history.

(56) References Cited

U.S. PATENT DOCUMENTS

| | | | | |
|---|---|---|---|---|
| 3,787,086 | A * | 1/1974 | Cosby | B66F 9/07545 |
| | | | | 296/65.07 |
| 9,481,556 | B2 * | 11/2016 | Oishi | B66F 9/07554 |
| 9,550,659 | B2 * | 1/2017 | Nakazawa | B60L 53/53 |
| 10,003,050 | B2 * | 6/2018 | Morisaku | H01M 10/6554 |
| 2015/0139768 | A1 * | 5/2015 | Egawa | B66C 23/74 |
| | | | | 414/719 |
| 2015/0239719 | A1 * | 8/2015 | Oishi | H01M 10/6551 |
| | | | | 180/68.5 |
| 2019/0103639 | A1 | 4/2019 | Guglielmo | |

FOREIGN PATENT DOCUMENTS

| | | |
|---|---|---|
| CN | 107200291 A | 9/2017 |
| JP | 2003226495 A | 8/2003 |
| JP | 5686389 B2 | 3/2015 |
| SE | 1451150 A1 | 3/2016 |

OTHER PUBLICATIONS

European Patent Office. Extended European Search Report for application 20167152.6, dated Jun. 29, 2020.

\* cited by examiner

*Primary Examiner* — James A Shriver, II
*Assistant Examiner* — James J Triggs
(74) *Attorney, Agent, or Firm* — Quarles & Brady LLP

(57) ABSTRACT

A battery panel assembly for a material handling vehicle having a battery is provided. The battery panel assembly includes an inner counterweight panel configured to couple to the battery assembly. The inner panel including a battery service cutout. The battery panel assembly further includes an outer panel configured to couple to the inner panel. The outer panel includes a cutout configured to align with the battery service cutout and an access door dimensioned to cover the cutout.

21 Claims, 4 Drawing Sheets

SYSTEMS AND METHODS FOR A BATTERY PANEL ASSEMBLY ON A MATERIAL HANDLING VEHICLE

CROSS-REFERENCES TO RELATED APPLICATIONS

The present application is based on and claims priority to U.S. Provisional Patent Application No. 62/829,420, filed on Apr. 4, 2019, and entitled "Method to Protect a Battery Assembly within a Battery Compartment and Add Counterweight to a Material Handling Vehicle," the entire disclosure of which is incorporated herein by reference.

STATEMENT REGARDING FEDERALLY SPONSORED RESEARCH

Not Applicable.

BACKGROUND

In general, material handling vehicles may include a battery. The battery may be a lithium-ion battery and may be housed in a battery compartment. The compartment may have a cover to protect the battery from environmental factors.

BRIEF SUMMARY

The present disclosure relates generally to a material handling vehicle, and, more specifically, systems and methods to enclose a compartment on the material handling vehicle to protect a battery from environmental factors. Additionally, the present disclosure relates to battery enclosure systems and methods that can add counterweight to the material handling vehicle.

In one aspect, the present disclosure provides a battery panel assembly for a material handling vehicle having a battery assembly. The battery panel assembly includes an inner counterweight panel configured to couple to the battery assembly. The inner panel including a battery service cutout. The battery panel assembly further includes an outer panel configured to couple to the inner panel. The outer panel includes a cutout configured to align with the battery service cutout, and an access door dimensioned to cover the cutout.

In one aspect, the present disclosure provides a battery panel assembly for a material handling vehicle having a battery compartment with a battery assembly. The battery compartment includes a left side and a right side. The battery panel assembly includes a right inner panel configured to couple to the right side of the battery compartment and a right outer panel configured to couple to the right inner panel. The right inner panel includes a first battery access cutout. The right outer panel includes a first opening in alignment with the first cutout and an access door dimensioned to cover the first opening. The battery panel assembly further includes a left inner panel configured to couple to the left side of the battery compartment and a left outer panel configured to couple to the left inner panel. The left inner panel includes a second battery access cutout. The left outer panel includes a second opening in alignment with the second battery access cutout and an access panel configured to cover the second opening.

In one aspect, the present disclosure provides a method for adding counterweight to a battery assembly on a material handling vehicle. The method includes coupling a first inner panel to a first side of the battery assembly, thereby adding counterweight to the battery assembly, and coupling a first outer panel to the first inner panel to enclose the battery assembly.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
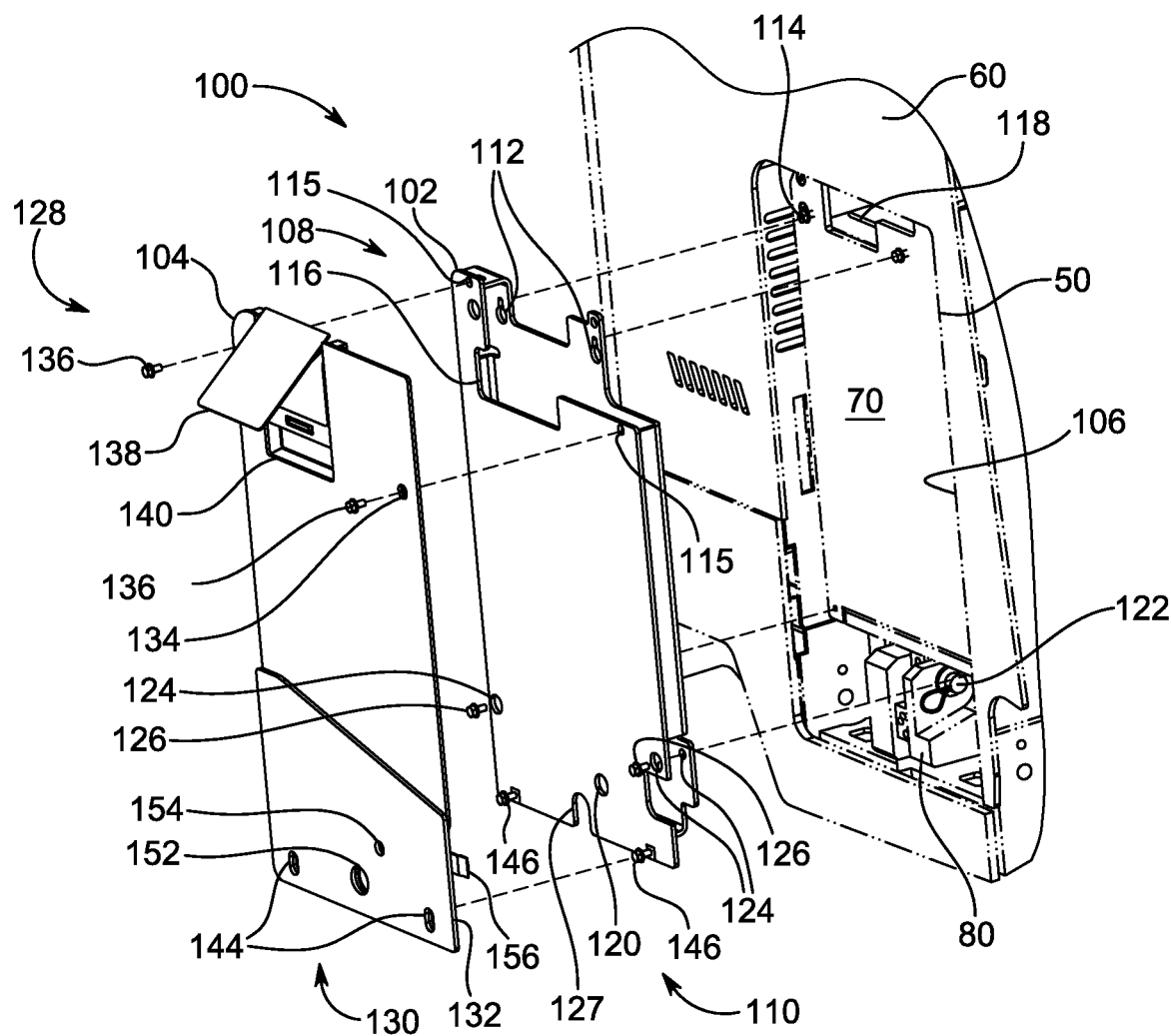
FIG. 1 is an exploded top, front, left isometric view of a right battery panel assembly according to an aspect of the present disclosure.

Before any aspect of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also as used herein, unless otherwise specified or limited, directional terms are presented only with regard to the particular embodiment and perspective described. For example, reference to features or directions as "horizontal," "vertical," "front," "rear," "left," "right," and so on are generally made with reference to a particular figure or example and are not necessarily indicative of an absolute orientation or direction. However, relative directional terms for a particular embodiment may generally apply to alternative orientations of that embodiment. For example, "front" and "rear" directions or features (or "right" and "left"

directions or features, and so on) may be generally understood to indicate relatively opposite directions or features.

Also as used herein, ordinal numbers are used for convenience of presentation only and are generally presented in an order that corresponds to the order in which particular features are introduced in the relevant discussion. Accordingly, for example, a "first" feature may not necessarily have any required structural or sequential relationship to a "second" feature, and so on. Further, similar features may be referred to in different portions of the discussion by different ordinal numbers. For example, a particular feature may be referred to in some discussion as a "first" feature, while a similar or substantially identical feature may be referred to in other discussion as a "third" feature, and so on.

Generally, the present disclosure provides a battery panel assembly including a right battery panel assembly and a left battery panel assembly configured for a material handling vehicle. The right battery panel assembly and the left battery panel assembly may enclose a battery compartment on the material handling vehicle and protect a battery within the battery compartment from environmental factors. In one non-limiting example, the battery may be a lithium-ion battery. Additionally, the battery panel assembly may act as a vehicle counterweight while providing for installation and alignment of a multi-layered cover over a battery compartment opening.

A battery panel assembly according to the present disclosure may include a first or right assembly and a second or left assembly. FIG. 1 illustrates one non-limiting example of a first or right battery panel assembly 100 according to one aspect of the present disclosure. The right battery panel assembly 100 may be configured to engage one side (e.g., a right side) of a battery compartment 50 on a material handling vehicle 60. The battery compartment 50 may house a battery assembly 70 and counterweight assembly 80. The right battery panel assembly 100 may include a right inner panel 102 and a right outer panel 104. When assembled, the right battery panel assembly 100 may be configured to cover a right opening 106 of the battery compartment 50 (see, e.g., FIG. 2).

As shown in FIG. 1, the right inner panel 102 may be configured to be removably coupled to the battery assembly 70. Additionally or alternatively, the right inner panel 102 may be coupled to any combination of the battery compartment 50, material handling vehicle 60, or the counterweight assembly 80. The right outer panel 104 may be removably coupled to the right inner panel 102. Similar to the right inner panel 102, the right outer panel 104 may be additionally or alternatively coupled to any combination of the battery compartment 50, material handling vehicle 60, the battery assembly 70, or the counterweight assembly 80. In another non-limiting example, the right battery panel assembly 100 may include a single panel, however other configurations are possible. For example, the right battery panel assembly 100 may include more than two panels.

The right inner panel 102 of the right battery panel assembly 100 can include a top portion 108 and a bottom portion 110. The top portion 108 of the right inner panel 102 may include at least one keyhole slot 112. In the illustrated non-limiting example, the top portion 108 of the right inner panel 102 may include a pair of keyhole slots 112 that are laterally separated from one another. Each of the keyhole slots 112 may be configured to receive a fastener 114, which can be a screw, pin, rod, or any other suitable type of mounting hardware. In another non-limiting example, the right inner panel 102 may include more or less than two of keyhole slots 112 on the top portion 108 and/or the bottom portion 110, which may be configured to receive a corresponding number of fasteners. The plurality of keyhole slots 112, for example, may be configured to engage a protrusion, which facilitates securing and aligning the right inner panel 102 to the material handling vehicle 60 or the battery assembly 70.

The top portion 108 of the right inner panel 102 may include one or more fastening apertures 115 and a battery service cutout 116 dimensioned to allow a charger (not shown) to access a battery mounted charging connector 118 on the battery assembly 70, when the right battery panel assembly 100 is assembled and covering the right opening 106 of the battery compartment 50. In another non-limiting example, the battery service cutout 116 may include a removable cover. The removable cover, for example, may be removably coupled or hingedly connected to the right inner panel 102 to provide access to the battery mounted charging connector 118.

The bottom portion 110 of the right inner panel 102 may include an inner panel inspection hole 120 dimensioned to provide visual access to a battery retaining pin 122 to see that the battery assembly 70 has been secured to the counterweight assembly 80. The battery retaining pin 122 may be inserted through holes in the counterweight assembly 80 and the battery assembly 70, and may be retained by a pin. The bottom portion 110 of the right inner panel 102 may further include one or more clearance holes 124. In the illustrated non-limiting example, the bottom portion 110 includes two clearance holes 124 that are laterally separated from one another. Each of the clearance holes 124 may be configured to receive a fastener 126, which can be a screw, pin, rod, or any other suitable type of mounting hardware. In another non-limiting example, the right inner panel 102 may include a plurality of clearance holes in the top portion 108 and/or the bottom portion 110 each configured to receive a fastener.

Additionally, the bottom portion 110 of the right inner panel 102 may include a notch 127 that facilitates lifting and removal of the right inner panel 102 from the material handling vehicle 60. In some applications, the notch 127 may provide access to a remote grease fitting (not shown) on the material handling vehicle 60. In the illustrated non-limiting example of FIG. 1, the notch 127 may be arranged along a bottom surface or edge of the bottom portion 110 of the right inner panel 102, however, other configurations are possible. For example, the notch 127 may be on any of the sides of the right inner panel 102 or may be a through hole on a surface of the right inner panel 102.

The right outer panel 104 of the right battery panel assembly 100 may include a top portion 128, a bottom portion 130, and a right edge 132. The top portion 128 of the right outer panel 104 may include at least one clearance hole 134. In the illustrated non-limiting example, the top portion 128 of the right outer panel 104 includes two clearance holes 134 that are laterally separated from one another. Each of the clearance holes 134 may be configured to receive a fastener 136, which can be a screw, pin, rod, or any other suitable type of mounting hardware. In another non-limiting example, the right outer panel 104 may include a plurality of clearance holes in the top portion 128 and/or the bottom portion 130 each configured to receive a fastener. Further, the top portion 128 may include a charge connector access door 138. The charge connector access door 138 may be hingedly connected or removably coupled to the right outer panel 104. The charge connector access door 138 may cover a cutout 140 dimensioned to allow the charger to access the battery mounted charging connector 118 on the battery assembly 70 when the right battery panel assembly 100 is fully assembled and covering the right opening 106 of the battery compartment 50. In other words, the cutout 140 is configured to align with the battery service cutout 116.

The bottom portion 130 of the right outer panel 104 may include at least one keyhole 144. In the illustrated non-limiting example, the bottom portion 130 of the right outer panel 104 may include two keyholes 144 that are laterally separated from one another. Each of the keyholes 144 may be configured to receive a fastener 146, which can be a screw, pin, rod, or any other suitable type of mounting hardware. In the illustrated non-limiting example, the keyholes 144 may be configured to engage the fasteners 146, which are configured as a protrusion from the right inner panel 102. In another non-limiting example, the right outer panel 104 may include a plurality of keyhole slots on the top portion 128 and/or the bottom portion 130 each configured to receive a fastener.

The bottom portion 130 of the right outer panel 104 may further include a lifting hole 152 that may facilitate the installation and removal of the right outer panel 104 to the material handling vehicle 60. In the illustrated non-limiting example of FIG. 1, the lifting hole 152 may be substantially centered in the bottom portion 130 of the right outer panel 104, however, other configurations are possible. For example, the lifting hole 152 may be located at various locations along the top portion 128 or the bottom portion 130 of the right outer panel 104. The lifting hole 152 may alternatively be configured as a notch similar to notch 127 in the right inner panel 102. In some applications, the lifting hole 152 may provide access to a remote grease fitting (not shown) on the material handling vehicle 60.

The bottom portion 130 of the right outer panel 104 may further include an outer panel inspection hole 154 that aligns with the inspection hole 120 on the right inner panel 102, which may provide visual access to the battery retaining pin 122 to see that the battery assembly 70 has been secured to the counterweight assembly 80.

The right edge 132 of the right outer panel 104 may include a sensor target bracket 156. The sensor target bracket 156 may be used to verify that the right battery panel assembly 100 has been installed before operation of the material handling vehicle 60. The sensor target bracket 156 may be detected by a sensor on the material handling vehicle 60. In other non-limiting examples, the sensor target bracket 156 may be located on any of the sides of the right outer panel 104.

To assemble the first or right battery panel assembly 100, the right inner panel 102 may initially be coupled to one side of the battery assembly 70. For example, the right inner panel 102 may be installed onto one side of the battery assembly 70, such that the fasteners 114 extend through the keyhole slots 112. With the fasteners 114 installed within the keyhole slots 112, the right inner panel 102 may be supported on the side of the battery assembly 70. The fasteners 126 may then be inserted through the clearance holes 124 and be fastened to, for example, a threaded aperture on the side of the battery assembly 70 to fasten the right inner panel 102 to the battery assembly 70.

With the right inner panel 102 installed onto the battery assembly 70, the right outer panel 104 may be installed onto the right inner panel 102, thereby covering the right opening 106 and substantially enclosing the side of the battery assembly 70. For example, the right outer panel 104 may be installed onto the right inner panel 102, such that the fasteners 146 extend through the keyholes 144. With the fasteners 146 installed within the keyholes 144, the right outer panel 104 may be supported on the right inner panel 102. The fasteners 136 may then be inserted through the clearance holes 134 and be fastened to the fastening apertures 115 on the right inner panel 102 to fasten the right outer panel 104 to the right inner panel 102.

During assembly, the notch 127 and the lifting hole 152 may be used to support the right inner panel 102 and the right outer panel 104, respectively. For example, a crane, a lift, a jack, or another form of support may be coupled to the notch 127 and the lifting hole 152 during assembly.

Figure 2:
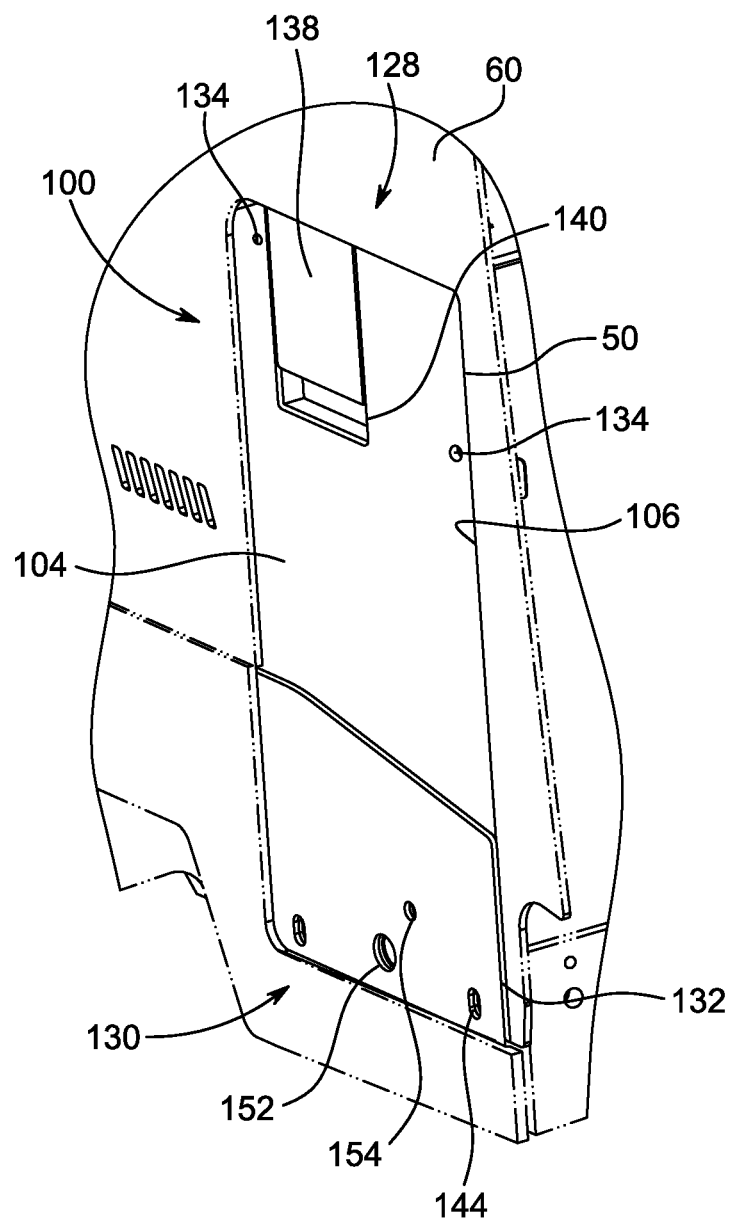
FIG. 2 is a top, front, left isometric view of the right battery panel assembly of FIG. 1 with the right battery panel assembly assembled.

As illustrated in FIG. 2, when the first or right battery panel assembly 100 is installed onto the battery assembly 70, the right outer panel 104 is generally received within the right opening 106 to enclose the battery assembly 70. In general, the right inner panel 102 may weigh more than the right outer panel 104, for example, due to the right inner panel 102 being fabricated from a material with a higher density. In this way, for example, the right inner panel 102 may serve as an additional counterweight. In one non-limiting example, the right inner panel 102 may be fabricated from a steel material, however, other materials are possible. For example, the right inner panel 102 may be fabricated from ductile iron. The weight of the right inner panel 102 may be varied by adding or removing material to the right inner panel 102 to add weight to the material handling vehicle 60. The right inner panel 102 may also provide additional protection to the battery assembly 70.

In one non-limiting example, the right outer panel 104 may be fabricated from a steel material, however, other configurations are possible. For example, the right outer panel 104 may be fabricated from a relatively lighter weight material such as aluminum or plastic. The right outer panel 104 may provide the battery compartment 50 with additional protection for the battery assembly 70 of the material handling vehicle 60. In addition, the right outer panel 104 may selectively provide access to components of the battery assembly 70, as needed. For example, the access door 138 may be manipulated to selectively provide access to the battery mounted charging connector 118.

Figure 3:
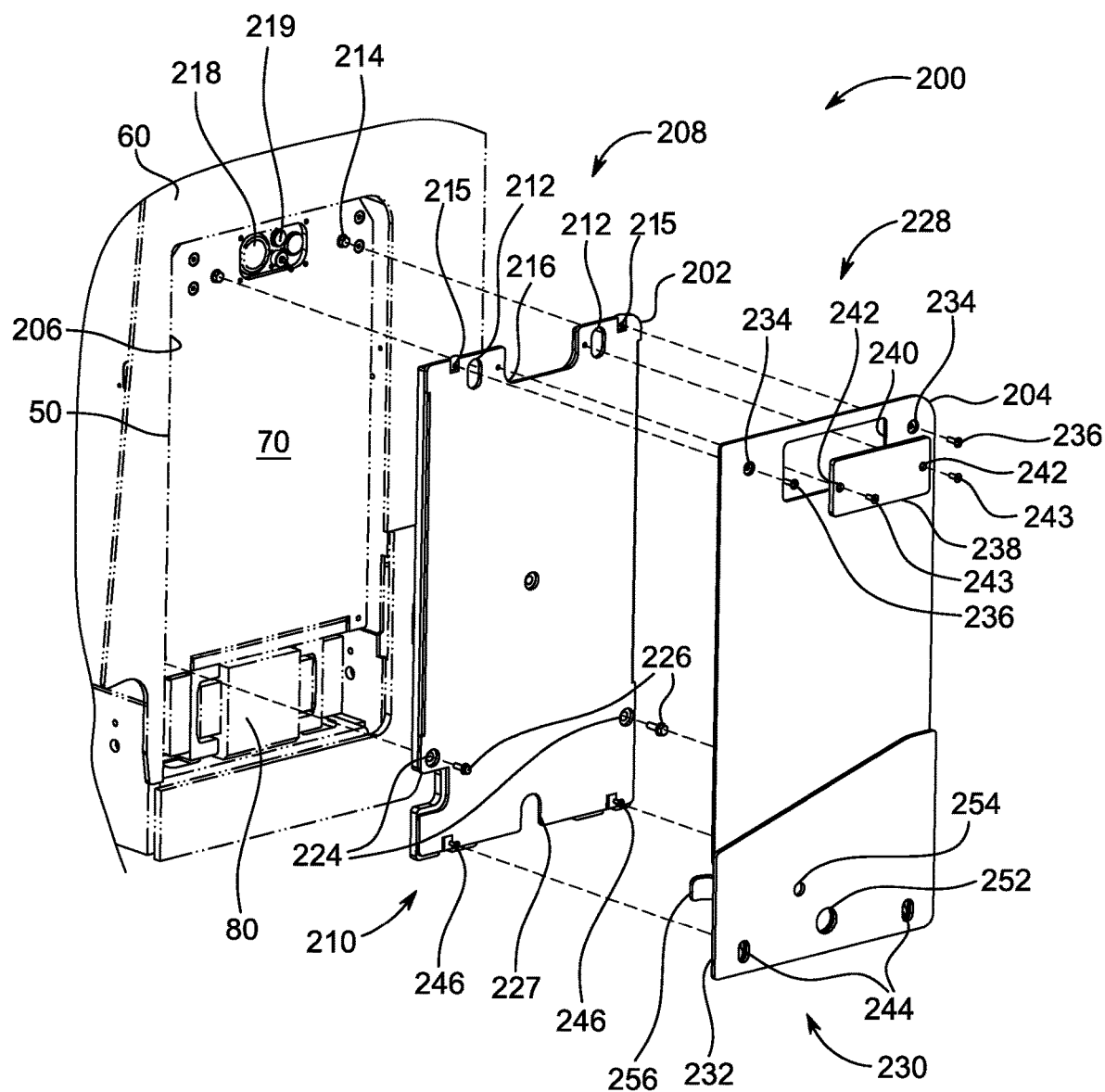
FIG. 3 is an exploded top, front, right isometric view of a left battery panel assembly according to an aspect of the present disclosure.

FIG. 3 illustrates a non-limiting example of a second or left battery panel assembly 200 according to one aspect of the present disclosure. The left battery panel assembly 200 is configured to engage one side (e.g., a left side) of the battery compartment 50 on the material handling vehicle 60. The left battery panel assembly 200 may include a second or left inner panel 202 and a second or left outer panel 204. The left battery panel assembly 200 may be configured to cover a second left opening 206 of a battery compartment 50 on a material handling vehicle 60.

As shown in FIG. 3, the left inner panel 202 may be configured to be removably coupled to the battery assembly 70. Additionally or alternatively, the left inner panel 202 may be coupled to any combination of the battery compartment 50, material handling vehicle 60, or the counterweight assembly 80. The left outer panel 204 may be removably coupled to the left inner panel 202. Similar to the left inner panel 202, the left outer panel 204 may be additionally or alternatively coupled to any combination of the battery compartment 50, material handling vehicle 60, the battery assembly 70, or the counterweight assembly 80. In another non-limiting example, the left battery panel assembly 200 may include a single panel, however other configurations are possible. For example, the left battery panel assembly 200 may include more than two panels.

The left inner panel 202 of the left battery panel assembly 200 can include a top portion 208 and a bottom portion 210. The top portion 208 of the left inner panel 202 may include at least one keyhole slot 212. In the illustrated non-limiting example, the top portion 208 of the left inner panel 202 may include a pair of keyhole slots 212 that are laterally separated from one another. Each of the keyhole slot 212 may be configured to receive a fastener 214, which can be a screw, pin, rod, or any other suitable type of mounting hardware. In another non-limiting example, the left inner panel 202 may include a more or less than two keyhole slots 212 on the top portion 208 and/or the bottom portion 210, which may be configured to receive a corresponding number of fasteners. The plurality of keyhole slots 212, for example, may be configured to engage a protrusion that facilitates securing and aligning the left inner panel 202 to the material handling vehicle 60 or the battery assembly 70.

The top portion 208 of the left inner panel 202 may include one or more fastening apertures 215 arranged laterally outwardly relative to the keyhole slots 212 and a battery service cutout 216. The battery service cutout 216 may be dimensioned to allow access to a display 218 and service ports 219 on the battery assembly 70, when the left battery panel assembly 200 is fully assembled and covering the left opening 206 of the battery compartment 50. In another non-limiting example, the battery service cutout 216 may include a removable cover. The removable cover, for example, may be removably coupled or hingedly connected to the left inner panel 202 to provide access to the display 218 and service ports 219 on the battery assembly 70.

The bottom portion 210 of the left inner panel 202 may include an inner panel inspection hole (not shown) dimensioned to allow a battery retaining pin (not shown) to pass through. The bottom portion 210 of the left inner panel 202 may further include at least one clearance hole 224. In the illustrated non-limiting example, the bottom portion 210 includes two clearance holes 224 that are laterally separated from one another. Each of the clearance hole 224 may be configured to receive a fastener 226, which can be a screw, pin, rod, or any other suitable type of mounting hardware. In another non-limiting example, the left inner panel 202 may include a plurality of clearance holes in the top portion 208 and/or the bottom portion 210 each configured to receive a fastener.

Additionally, the bottom portion 210 of the left inner panel 202 may include a notch 227 that facilitates lifting and removal of the left inner panel 202 from the material handling vehicle 60. In the illustrated non-limiting example of FIG. 3, the notch 227 may be arranged along a bottom surface or edge of the bottom portion 210 of the left inner panel 202, however, other configurations are possible. For example, the notch 227 may be on any of the sides of the left inner panel 202 or may be a through hole on a surface of the left inner panel 202.

The left outer panel 204 of the left battery panel assembly 200 may include a top portion 228, a bottom portion 230, and a left edge 232. The top portion 228 of the left outer panel 204 may include at least one clearance hole 234. In the illustrated non-limiting example, the top portion 228 of the left outer panel 204 includes two clearance holes 234 that are laterally separated from one another. Each of the clearance holes 234 may be configured to receive a fastener 236, which can be a screw, pin, rod, or any other suitable type of mounting hardware. In another non-limiting example, the left outer panel 204 may include a plurality of clearance holes in the top portion 228 and/or the bottom portion 230 each configured to receive a fastener.

The top portion 228 may include an access panel 238. The access panel 238 may have at least one mounting hole 242 to receive at least one fastener 243. In the illustrated non-limiting example, the access panel 238 includes two mounting holes 242 that are laterally separated from one another and each configured to receive a fastener 243. The access panel 238 may be removably coupled to the left outer panel 204 via the fasteners 243. The access panel 238 may cover a cutout 240 on the top portion 228. The cutout 240 may be configured to selectively provide access to the display 218 and the service ports 219 on the battery assembly 70, when the left battery panel assembly 200 is fully assembled. In other words, the cutout 240 is configured to align with the battery service cutout 216 and may be selectively removed from the left outer panel 204. In another non-limiting example, the access panel 238 may be hingedly or slidably coupled to the left outer panel 204.

The bottom portion 230 of the left outer panel 204 may include at least one keyhole 244. In the illustrated non-limiting example, the bottom portion 230 of the left outer panel 204 may include two keyholes 244 that are laterally separated from one another. Each of the keyholes 244 may be configured to receive a fastener 246, which can be a screw, pin, rod, or any other suitable type of mounting hardware. In the illustrated non-limiting example, the keyholes 244 are configured to engage the fasteners 246, which are configured as a protrusion from the left inner panel 202. In another non-limiting example, the left outer panel 204 may include a plurality of keyhole slots on the top portion 228 and/or the bottom portion 230 each configured to receive a fastener.

The bottom portion 230 of the left outer panel 204 may further include a lifting hole 252 that may facilitate the installation and removal of the left outer panel 204 to the material handling vehicle 60. In the illustrated non-limiting example of FIG. 3, the lifting hole 252 may be substantially centered in the bottom portion 230 of the left outer panel 204, however, other configurations are possible. For example, the lifting hole 252 may be located at various locations along the top portion 228 or the bottom portion 230 of the left outer panel 204. The lifting hole 252 may alternatively be configured as a notch similar to notch 227 in the left inner panel 202.

The left edge 232 of the left outer panel 204 may include a sensor target bracket 256. The sensor target bracket 256 may be used to verify that the left battery panel assembly 200 is installed before operation of the material handling vehicle 60. The sensor target bracket 256 may be detected by a sensor on the material handling vehicle 60. In other non-limiting examples, the sensor target bracket 256 may be located on any of the sides of the left outer panel 204.

To assemble the second or left battery panel assembly 200, the left inner panel 202 may initially be coupled to one side of the battery assembly 70. For example, the left inner panel 202 may be installed onto one side of the battery assembly 70, such that the fasteners 214 extend through the keyhole slots 212. With the fasteners 214 installed within the keyhole slots 212, the left inner panel 202 may be supported on the side of the battery assembly 70. The fasteners 226 may then be inserted through the clearance holes 224 and be fastened to, for example, a threaded aperture on the side of the battery assembly 70 to fasten the left inner panel 202 to the battery assembly 70.

With the left inner panel 202 installed onto the battery assembly 70, the left outer panel 204 may be installed onto the left inner panel 202, thereby covering the left opening 206 and substantially enclosing the side of the battery assembly 70. For example, the left outer panel 204 may be installed onto the left inner panel 202, such that the fasteners 246 extend through the keyholes 244. With the fasteners 246 installed within the keyholes 244, the left outer panel 204 may be supported on the left inner panel 202. The fasteners 236 may then be inserted through the clearance holes 234 and be fastened to the fastening apertures 215 on the left inner panel 202 to fasten the left outer panel 204 to the left inner panel 202.

During assembly, the notch 227 and the lifting hole 252 may be used to support the left inner panel 202 and the left outer panel 204, respectively. For example, a crane, a lift, a jack, or another form of support may be coupled to the notch 227 and the lifting hole 252 during assembly.

Figure 4:
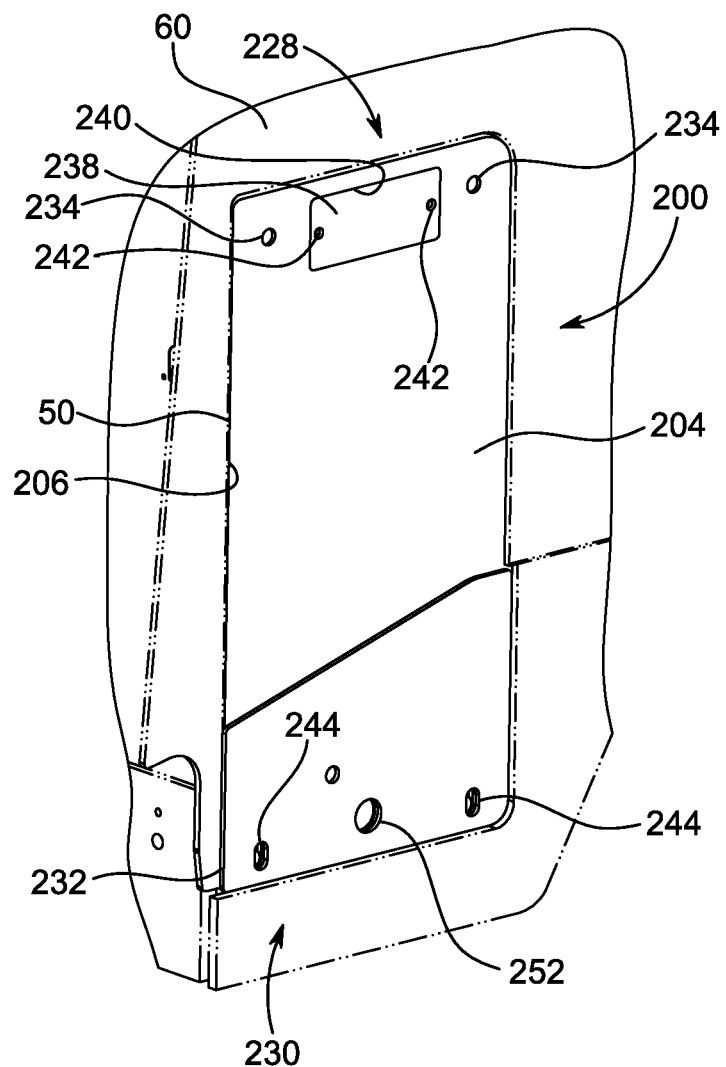
FIG. 4 is a top, front, right, isometric view of the left battery panel assembly of FIG. 3 with the left battery assembly assembled.

As illustrated in FIG. 4, when the second or left battery panel assembly 200 is installed onto the battery assembly 70, the left outer panel 204 is generally received within the left opening 206 to enclose the battery assembly 70. In general, the left inner panel 202 may weigh more than the left outer panel 204, for example, due to the left inner panel 202 being fabricated from a material with a higher density. In this way, for example, the left inner panel 202 may serve as an additional counterweight. In one non-limiting example, the left inner panel 202 may be fabricated from a steel material, however, other materials are possible. For example, the left inner panel 202 may be fabricated from ductile iron. The weight of the left inner panel 202 may be varied by adding or removing material to the left inner panel 202 to add weight to the material handling vehicle 60. The left inner panel 202 may also provide additional protection to the battery assembly 70.

In one non-limiting example, the left outer panel 204 may be fabricated from a steel material, however, other configurations are possible. For example, the left outer panel 204 may be fabricated from a relatively lighter weight material such as aluminum or plastic. The left outer panel 204 may provide the battery compartment 50 with additional protection for the battery assembly 70 of the material handling vehicle 60. In addition, the left outer panel 204 may selectively provide access to components of the battery assembly 70, as needed. For example, the access panel 238 may be selectively removed to provide access to the display 218 and the service ports 219.

It is to be appreciated that each of the inner panels and outer panels can be made of various materials. For example, the inner panels can be a casting of steel or ductile iron, as non-limiting examples. The outer panels can be a lighter weight material. For example, the outer panels can be made from aluminum or plastic, as non-limiting examples.

While various spatial and directional terms, such as top, bottom, lower, mid, lateral, horizontal, vertical, front, and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

I claim:

1. A battery panel assembly for a material handling vehicle having a battery assembly, the battery panel assembly comprising:
    an inner counterweight panel configured to couple to the battery assembly, the inner counterweight panel including a battery service cutout; and
    an outer panel configured to couple to the inner panel, the outer panel including a cutout configured to align with the battery service cutout and an access door dimensioned to cover the cutout.

2. The battery panel assembly of claim 1, wherein the outer panel includes a bracket configured to verify installation of the outer panel on the material handling vehicle.

3. The battery panel assembly of claim 1, wherein the access door is pivotally coupled to the outer panel.

4. The battery panel assembly of claim 3, wherein pivoting the access door is configured to provide access to components of the battery assembly.

5. The battery panel assembly of claim 1, wherein the access door includes fasteners configured to couple and decouple the battery service door from the outer panel to selectively provide access to components of the battery assembly.

6. The battery panel assembly of claim 1, wherein a weight of the inner counterweight panel is greater than a weight of the outer panel.

7. The battery panel assembly of claim 1, wherein the inner counterweight panel engages the battery compartment at a first side of the material handling vehicle; and
    wherein the battery panel assembly includes a second inner counterweight panel and a second outer panel, the second inner counterweight panel being configured to engage the battery compartment at a second side of the material handling vehicle and the second outer panel configured to engage the second inner counterweight panel.

8. The battery panel assembly of claim 1, wherein the inner counterweight panel is fabricated from an iron material.

9. The battery panel assembly of claim 1, wherein the inner counterweight panel is fabricated from a steel material.

10. The battery panel assembly of claim 1, wherein the outer panel is fabricated from a plastic material.

11. A battery panel assembly for a material handling vehicle having a battery compartment with a battery assembly, the battery compartment having a left side and a right side, the battery panel assembly comprising:
    a right inner panel configured to couple to the right side of the battery compartment, the right inner panel including a first battery access cutout;
    a right outer panel configured to couple to the right inner panel, the right outer panel including a first opening in alignment with the first cutout and an access door dimensioned to cover the first opening;
    a left inner panel configured to couple to the left side of the battery compartment, the left inner panel including a second battery access cutout; and
    a left outer panel configured to couple to the left inner panel, the left outer panel including a second opening in alignment with the second battery access cutout and an access panel configured to cover the second opening.

12. The battery panel assembly of claim 11, wherein the right outer panel includes a first bracket configured to verify installation of the right outer panel on the material handling vehicle, and the left outer panel includes a second bracket configured to verify installation of the left outer panel on the material handling vehicle.

13. The battery panel assembly of claim 11, wherein the access door is pivotally coupled to the right outer panel.

14. The battery panel assembly of claim 13, wherein pivoting the access door is configured to provide access to components of the battery assembly.

15. The battery panel assembly of claim 11, wherein the access panel is removably coupled to the left outer panel by at least one fastener.

16. The battery panel assembly of claim 15, whereby removal of the access panel is configured to provide access to components of the battery assembly.

17. The battery panel assembly of claim 11, wherein each of the right inner panel and the left inner panel is a counterweight.

18. The battery panel assembly of claim 11, wherein a weight of the right inner counterweight panel is greater than a weight of the right outer panel.

19. The battery panel assembly of claim 11, wherein a weight of the left inner counterweight panel is greater than a weight of the left outer panel.

20. A method for adding counterweight to a battery assembly on a material handling vehicle, the method comprising:
coupling a first inner panel to a first side of the battery assembly, thereby adding counterweight to the battery assembly; and
coupling a first outer panel to the first inner panel to enclose the battery assembly.

21. The method of claim 20, further comprising:
coupling a second inner panel to a second side of the battery assembly, thereby adding counterweight to the battery assembly; and
coupling a second outer panel to the second inner panel to enclose the battery assembly.

* * * * *